(12) United States Patent
Luomi et al.

(10) Patent No.: US 11,694,563 B2
(45) Date of Patent: Jul. 4, 2023

(54) METHOD AND APPARATUS TO CONTROL ONE OR MORE DRONES BASED ON REAL-TIME OR PREDICTIVE POSITION INFORMATION

(71) Applicant: HERE GLOBAL B.V., Eindhoven (NL)

(72) Inventors: Marko Luomi, Lempäälä (FI); Lauri Aarne Johannes Wirola, Tampere (FI); Petri Rauhala, Tampere (FI); Jouni Kämäräinen, Tampere (FI)

(73) Assignee: HERE GLOBAL B.V., Eindhoven (NL)

(*) Notice: Subject to any disclaimer, the term of this patent is extended or adjusted under 35 U.S.C. 154(b) by 568 days.

(21) Appl. No.: 16/506,149

(22) Filed: Jul. 9, 2019

(65) Prior Publication Data

US 2021/0012673 A1 Jan. 14, 2021

(51) Int. Cl.
| | |
|---|---|
| *G08G 5/04* | (2006.01) |
| *B64C 39/02* | (2023.01) |
| *G06N 5/04* | (2023.01) |
| *G06K 9/00* | (2022.01) |
| *G06N 5/046* | (2023.01) |
| *G06V 40/20* | (2022.01) |
| *G06V 40/10* | (2022.01) |

(52) U.S. Cl.
CPC ........... *G08G 5/045* (2013.01); *B64C 39/024* (2013.01); *G06N 5/046* (2013.01); *G06V 40/103* (2022.01); *G06V 40/23* (2022.01); *B64U 2201/20* (2023.01)

(58) Field of Classification Search
CPC ............. G08G 5/045; B64C 39/024; B64C 2201/146; B64C 2201/141; G06K 9/00342; G06K 9/00369; G06K 9/00771; G06N 5/04; G05D 1/106
See application file for complete search history.

(56) References Cited

U.S. PATENT DOCUMENTS

| | | | |
|---|---|---|---|
| 9,796,091 B1 * | 10/2017 | Soo | ..................... G06Q 10/1095 |
| 9,939,810 B1 * | 4/2018 | Matheson | .................. G06F 3/14 |
| 2017/0023947 A1 * | 1/2017 | McMillion | ............... B64D 1/22 |
| 2017/0112345 A1 | 4/2017 | Frey | |
| 2017/0187993 A1 | 6/2017 | Martch et al. | |

(Continued)

FOREIGN PATENT DOCUMENTS

CN 109884615 A * 6/2019

OTHER PUBLICATIONS

Machine Translation CN-109884615-A (year:2019).*

*Primary Examiner* — Anne Marie Antonucci
*Assistant Examiner* — Connor L Knight
(74) *Attorney, Agent, or Firm* — Alston & Bird LLP (57) ABSTRACT

A method, apparatus and system are provided for operating one or more drones in a building. In the context of a method, information is determined that includes at least one of real time information or predictive information. The real time information is indicative of a position of at least one individual in the building, while the predictive information is indicative of a predicted location of the at least one individual in the building at a certain time. The method also includes controlling the one or more drones in the building according to the at least one of the real time information or the predictive information to avoid the at least one individual while the drone is performing a task.

20 Claims, 6 Drawing Sheets

(56) References Cited

U.S. PATENT DOCUMENTS

| | | | |
|---|---|---|---|
| 2017/0192435 A1* | 7/2017 | Bakhishev | G05D 1/028 |
| 2017/0355076 A1 | 12/2017 | Gordon-Carroll et al. | |
| 2019/0171218 A1* | 6/2019 | Hammond | G05D 1/0214 |
| 2019/0248487 A1* | 8/2019 | Holtz | G06K 9/0063 |
| 2019/0265707 A1* | 8/2019 | Cantrell | B60L 53/80 |
| 2019/0317530 A1* | 10/2019 | Yang | G08G 5/0069 |
| 2020/0033865 A1* | 1/2020 | Mellinger, III | A47L 9/2852 |
| 2020/0150655 A1* | 5/2020 | Artes | G05D 1/0219 |
| 2020/0369384 A1* | 11/2020 | Kelly | G05D 1/106 |
| 2020/0379487 A1* | 12/2020 | Iwase | G08G 5/0082 |

\* cited by examiner

METHOD AND APPARATUS TO CONTROL ONE OR MORE DRONES BASED ON REAL-TIME OR PREDICTIVE POSITION INFORMATION

TECHNICAL FIELD

An example embodiment of the present invention relates to a system, apparatus, and method for operating one or more drones in a building that may also house one or more individuals.

BACKGROUND

Drones are unmanned aerial vehicles (UAV) that are either manually controlled, such as via a radio controller, or autonomously functioning so as to follow, e.g., a programmed route. Drones can be used to perform any number of tasks such as delivering goods or remote sensing utilizing, for example, visible or infrared sensors and/or radar.

When drones are operating indoors, care is taken to insure the safety of any people in the same space. While drones often have sensors of their own, such as cameras, light detection and ranging (LIDAR) sensors or radar, to detect people and objects in an effort to avoid collisions, such onboard sensors may not be sufficient. Moreover, even though drones may be able to fly high above people indoors, there is a risk of drone malfunction, which would may cause the drone to land unexpectedly, potentially in the vicinity of people. In package delivery applications, it is also possible that a package or object carried by the drone becomes disengaged drops from the drone, again potentially in the vicinity of people.

In order to safely operate drones indoors and in light of the risk involved in instances in which a drone is operated in a space that is also occupied by one or more people, drones are sometimes only operated in a space that is free of people. However, this practice may disadvantageously result in restricted flying times and underutilization of the drones.

SUMMARY

Accordingly, a method, apparatus, and system are provided for operating one or more drones within a building which also houses one or more people. The method, apparatus and system of an example embodiment are configured to safely operate the drone within the building. Additionally, the method, apparatus and system of an example embodiment are configured to operate the drone within the building even in an instance in which one or more people are also within the building, thereby increasing the utilization of the drone.

In an example embodiment, a method is provided for operating one or more drones in a building. The method includes determining information comprising at least one of real time information or predictive information. The real time information is indicative of a position of at least one individual in the building, while the predictive information is indicative of a predicted location of the at least one individual in the building at a certain time. The method also includes controlling the one or more drones in the building according to the at least one of the real time information or the predictive information to avoid the at least one individual while the drone is performing a task.

The method of an example embodiment controls the one or more drones by controlling the one or more drones to maintain the drone at least a predetermined distance away from the at least one individual in the building according to the at least one of the real time information or the predictive information. In an example embodiment, the method controls the one or more drones by controlling the speed of the one or more drones according to the at least one of the real time information or the predictive information. The method of an example embodiment controls the one or more drones by landing the one or more drones according to the at least one of the real time information or the predictive information. In an example embodiment, the method controls the one or more drones by causing the one or more drones to fly to at least one of a landing or charging station in the building, according to the at least one of the real time information or the predictive information. The method of an example embodiment controls the one or more drones by causing the one or more drones to transmit a warning sound, according to the at least one of the real time information or the predictive information.

In an example embodiment, the real time information comprises at least one of: information from an application executed by at least one mobile device of the at least one individual; or information from at least one sensor in the building capable of detecting the position of the at least one individual. The predictive information of an example embodiment comprises at least one of: information from at least one calendar or scheduling application indicative of the position of the at least one individual; or information that is indicative of a historical route taken by the at least one individual at a certain time.

In another example embodiment, an apparatus is provided for operating one or more drones in a building. The apparatus includes at least one processor and at least one memory including computer program code with the at least one memory and the computer program code configured to, with the at least one processor, cause the apparatus at least to determine information comprising at least one of real time information or predictive information. The real time information is indicative of a position of at least one individual in the building, while the predictive information is indicative of a predicted location of the at least one individual in the building at a certain time. The at least one memory and the computer program code are also configured to, with the at least one processor, cause the apparatus to control the one or more drones in the building according to the at least one of the real time information or the predictive information to avoid the at least one individual while the drone is performing a task.

The at least one memory and the computer program code are configured to, with the at least one processor, cause the apparatus of an example embodiment to control the one or more drones by controlling the one or more drones to maintain the drone at least a predetermined distance away from the at least one individual in the building according to the at least one of the real time information or the predictive information. In an example embodiment, the at least one memory and the computer program code are configured to, with the at least one processor, cause the apparatus to control the one or more drones by controlling the speed of the one or more drone according to the at least one of the real time information or the predictive information. The at least one memory and the computer program code are configured to, with the at least one processor, cause the apparatus of an example embodiment to control the one or more drones by landing the one or more drone according to the at least one of the real time information or the predictive information. In an example embodiment, the at least one memory and the computer program code are configured to, with the at least one processor, cause the apparatus to control the one or more drones by causing the one or more drones to fly to at least one of a landing or charging station in the building, according to the at least one of the real time information or the predictive information. The at least one memory and the computer program code are configured to, with the at least one processor, cause the apparatus of an example embodiment to control the one or more drones by causing the one or more drones to transmit a warning sound, according to the at least one of the real time information or the predictive information.

The real time information of an example embodiment comprises at least one of: information from an application executed by at least one mobile device of the at least one individual; or information from at least one sensor in the building capable of detecting the position of the at least one individual. In an example embodiment, the predictive information comprises at least one of: information from at least one calendar or scheduling application indicative of the position of the at least one individual; or information that is indicative of a historical route taken by the at least one individual at a certain time.

In a further example embodiment, a system is provided for operating one or more drones in a building. The system includes a monitoring apparatus configured to determine information comprising at least one of real time information or predictive information. The real time information is indicative of a position of at least one individual in the building, while the predictive information is indicative of a predicted location of the at least one individual in the building at a certain time. The system also includes one or more drones in the building. The one or more drones are configured to operate under control of the monitoring apparatus and in accordance with at least one of the real time information or the predictive information to avoid the at least one individual while the drone is performing a task. The one or more drones are controlled by the monitoring apparatus in order to at least one of maintain at least a predetermined distance from the position of the at least one individual in the building according to at least one of the real time information or the predictive information or control the speed of the drone according to at least one of the real time information or the predictive information.

The system of an example embodiment also includes at least one sensor in the building capable of detecting the position of the at least one individual. The at least one sensor is in communication with the monitoring apparatus so as to provide information regarding the position of the at least one individual. In an example embodiment, the real time information comprises at least one of: information from an application executed by at least one mobile device of the at least one individual; or information from at least one sensor in the building capable of detecting the position of the at least one individual. The predictive information of an example embodiment comprises at least one of: information from at least one calendar or scheduling application indicative of the position of the at least one individual; or information that is indicative of a historical route taken by the at least one individual at a certain time.

In an example embodiment, a computer program product is provided for operating one or more drones in a building. The computer program product includes at least one non-transitory computer-readable storage medium having computer-executable program code instructions stored therein with the computer-executable program code instructions comprising program code instructions to determine information comprising at least one of real time information or predictive information. The real time information is indicative of a position of at least one individual in the building, while the predictive information is indicative of a predicted location of the at least one individual in the building at a certain time. The computer-executable program code instructions also include program code instructions to control the one or more drones in the building according to the at least one of the real time information or the predictive information to avoid the at least one individual while the drone is performing a task.

The program code instructions to control the one or more drones may include program code instructions to control the one or more drones to maintain the drone at least a predetermined distance away from the at least one individual in the building according to the at least one of the real time information or the predictive information. In an example embodiment, the program code instructions to control the one or more drones include program code instructions to control the speed of the one or more drones according to the at least one of the real time information or the predictive information. In an example embodiment, the program code instructions to control the one or more drones include program code instructions to land the one or more drones according to the at least one of the real time information or the predictive information. The program code instructions of one example embodiment to control the one or more drones include program code instructions to cause the one or more drones to fly to at least one of a landing or charging station in the building, according to the at least one of the real time information or the predictive information. In an example embodiment, the program code instructions to control the one or more drones include program code instructions to cause the one or more drones to transmit a warning sound, according to the at least one of the real time information or the predictive information.

In another example embodiment, an apparatus is provided for operating one or more drones in a building. The apparatus includes means for determining information comprising at least one of real time information or predictive information. The real time information is indicative of a position of at least one individual in the building, while the predictive information is indicative of a predicted location of the at least one individual in the building at a certain time. The apparatus also includes means for controlling the one or more drones in the building according to the at least one of the real time information or the predictive information to avoid the at least one individual while the drone is performing a task.

The apparatus of an example embodiment includes means for controlling the one or more drones to maintain the drone at least a predetermined distance away from the at least one individual in the building according to the at least one of the real time information or the predictive information. In an example embodiment, the apparatus includes means for controlling the speed of the one or more drones according to the at least one of the real time information or the predictive information. The means for controlling the one or more drones includes, in one embodiment, means for landing the one or more drones according to the at least one of the real time information or the predictive information. In an example embodiment, the means for controlling the one or more drones includes means for causing the one or more drones to fly to at least one of a landing or charging station in the building, according to the at least one of the real time information or the predictive information. The means for controlling the one or more drones includes, in one embodiment, means for causing the one or more drones to transmit a warning sound, according to the at least one of the real time information or the predictive information.

BRIEF DESCRIPTION OF THE DRAWINGS

Some embodiments of this present invention may be further understood by the detailed descriptions and corresponding figures.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

A method, apparatus and system of an example embodiment are directed to controlling one or more drones in a building, to avoid an individual within the building while the one or more drones performs a task, based on information regarding the position of the individual within the building. It is to be understood that throughout the present disclosure the use of the term individual should be understood to include any number of people, such as a single person or any number of people. Additionally, it should be understood that the one or more drones may include sensors and/or components known to one skilled in the art in order to determine the position of the respective drones in the building and/or the position of the respective drones relative to a space, an individual, or a charging and/or landing station within the building.

The task performed by the one or more drones may be any of the wide variety of tasks that a drone are capable of performing. These tasks may include, but are not limited to, cleaning a room, delivering objects, remote sensing or the like.

Figure 1:
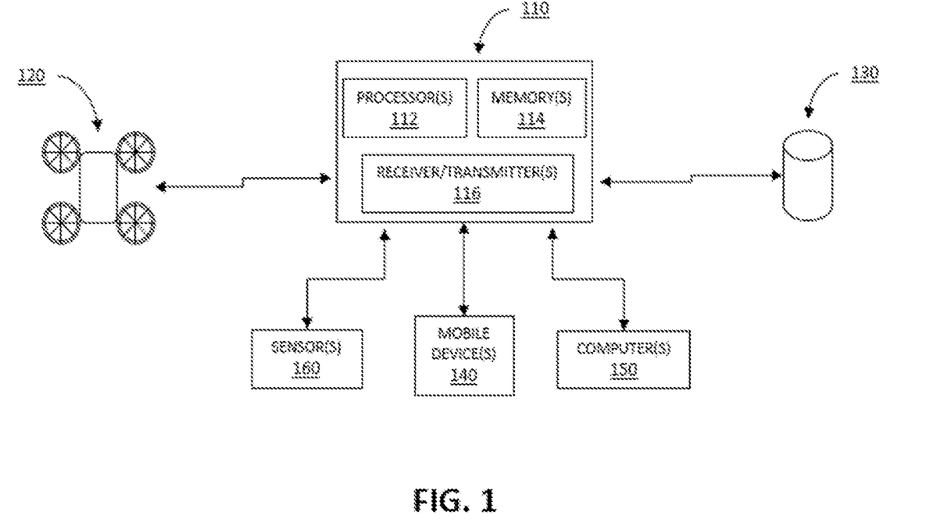
FIG. 1 is a diagram that depicts a system for operating a drone in a building that also houses one or more individuals in accordance with an example embodiment of the present disclosure.

FIG. 1 is a schematic block diagram of a system 100 according to an example aspect of the present invention. The system 100 may include at least a monitoring apparatus 110 and one or more drones 120. The monitoring apparatus 110 may include at least one processor 112, at least one memory 114, and at least one receiver/transmitter 116. The at least one receiver/transmitter 116 may allow the monitoring apparatus 110 to be in communication with the other components/devices within the system 100 including but not limited to one or more drones 120, a database 130, at least one mobile device 140, at least one computer 150, and/or at least one sensor 160. It is to be understood that the monitoring apparatus 110 may be in communication with any one of these components/devices and/or any combination of these components/devices. The at least one receiver/transmitter 116 may receive information from the database 130, at least one sensor 160, at least one mobile device 140, and/or at least one computer 150 that may be within a building, such as described below.

It is to be understood that any number of monitoring apparatuses 110 may be utilized. The monitoring apparatus 110 may be located within the building (in which the at least one sensor 160, at least one mobile device 140, and/or at least one computer 150 may additionally be located) or the monitoring apparatus 110 may be carried by the one or more drones 120. For example, in the instance the monitoring apparatus 110 is carried by the one or more drones, each drone may include a respective monitoring apparatus 110. Alternatively, in the instance in which the monitoring apparatus 110 is located within the one or more drones, the monitoring apparatus 110 may be carried by and included within only a subset of the one or more drones. In this example embodiment, the drone(s) that include the monitoring apparatus 110 may serve as master drones capable of being in communication with the other drones that do not have the monitoring apparatus 110. The master drones that include the monitoring apparatus 110 may be able to control the one or more drones that may not include the monitoring apparatus 110.

In the instance in which the monitoring apparatus is located within the building, a single monitoring apparatus 110 may be configured to coordinate operation of the one or more drones throughout the entire building. Alternatively, a plurality of monitoring apparatuses 110 may be located within and spaced throughout the building. In this example embodiment, each of the plurality of monitoring apparatuses 110 may be configured to coordinate operation of one or more drones on a specific floor or another particular space within the building. As used herein, a space within the building is intended to be understood as a room, hallway, floor, a portion of a room, a portion of a hallway, a portion of a floor or any other portion of the building. Alternatively, the plurality of monitoring apparatuses 110 of this example embodiment may cooperate to collectively control operation of the one or more drones throughout the entire building.

Figure 2:
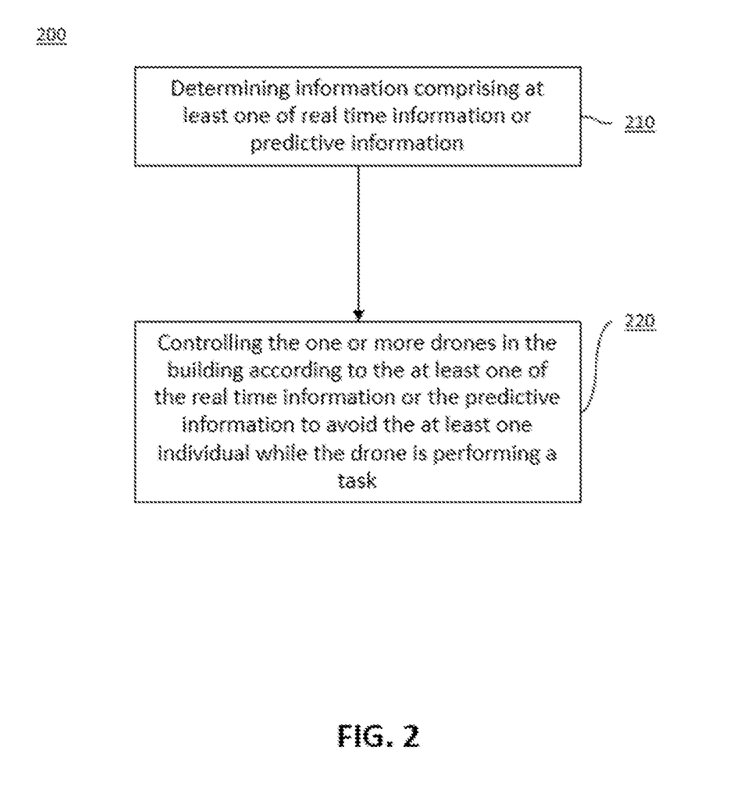
FIG. 2 is a flowchart of a method performed by the system and/or apparatus of FIG. 1.

FIG. 2 illustrates a flowchart of a method 200 according to an example embodiment of the present invention, and will be described herein with further reference to the system 100 of FIG. 1 and, more particularly, to the monitoring apparatus 110, which may comprise at least one processor (112) and at least one memory (114), such as a non-transitory computer readable storage medium, including computer program code, with the at least one memory and the computer program code being configured to, with the at least one processor, cause the monitoring apparatus 110 at least to perform and/or control the method of FIG. 1. As shown in FIG. 1, the monitoring apparatus 110 of an example embodiment may also include a communication interface, such as at least one receiver/transmitter 116 in communication with the at least one processor 112.

The at least one processor 112 may be a processor of any suitable type. The at least one processor 112 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the operations described below.

The at least one memory 114 may include program memory, such as may be included in or in communication with the at least one processor 112. This memory may for instance be fixedly connected to the at least one processor 112, or be at least partially removable from the at least one processor 112, for instance in the form of a memory card or stick. The program memory may for instance be non-volatile memory, such as a FLASH memory (or a part thereof), any of a ROM, PROM, EPROM and EEPROM memory (or a part thereof) or a hard disk (or a part thereof), to name but a few examples. The program memory may also comprise an operating system for the at least one processor 112 and/or firmware for the monitoring apparatus 110.

The at least one memory 114 may also optionally comprise a working memory, such as in the form of a volatile memory. The working memory may for instance be a Random Access Memory (RAM) or Dynamic RAM (DRAM), to give but a few non-limiting examples. The working memory may for instance be used by the at least one processor 112 when executing an operating system and/or other computer program.

The at least one memory 114 of an example embodiment may also include data memory which may for instance be a non-volatile memory. The data memory may for instance be a FLASH memory (or a part thereof), any of a ROM, PROM, EPROM and EEPROM memory (or a part thereof) or a hard disk (or a part thereof), to name but a few examples. The data memory may for instance store one or more pieces of real time information and/or predictive information, indoor map data, one or more pieces of control information, or a combination thereof, to name but a few non-limiting examples.

As shown in block 210 of FIG. 2, the monitoring apparatus 110 may include means, such as the at least one processor 112, configured to determine information comprising at least one of real time information or predictive information. In this regard, the real time information is indicative of the position of at least one individual in the building, while the predictive information is indicative of the predicted location of at least one individual within the building at a certain time. The information may be obtained by the at least one processor 112 from the receiver/transmitter 116 and/or the information may have been stored in the memory 114 and/or a database 130 that is accessible by the at least one processor. As described below, this information may be processed by the at least one processor 112 and may be used in order to control the one or more drones 120 within the building.

The database 130 may be any database, either within or remote from the building, which is capable of storing the information utilized by the monitoring apparatus 110 to control the operation of the one or more drones. Additionally, although reference is made herein to a database 130, the database may be a single database or a plurality of databases.

The information regarding the location of an individual may be provided by any of a plurality of sources. For example, the information may be provided by at least one mobile device 140 carried by the individual and configured to obtain and/or to provide real time information indicative of an individual's current position, such as based upon the location of the mobile device as defined, for example, by a global positioning system (GPS) or the like, and/or predictive information indicative of the predicted location of an individual based upon, for example, a route an individual may take at a certain time, a space an individual may be headed to at a certain time, or a historical route an individual may take at a certain time. The at least one mobile device 140 may be embodied by any of a variety of computing devices including, for example, a mobile phone, a tablet computer, a laptop computer, a personal navigation device, a personal fitness device, etc.

In an example embodiment, the real time information may be obtained and/or transmitted by the at least one mobile device 140 and, more particularly, by an application executed by the at least one mobile device. The application may be configured, for example, to monitor the location of the mobile device 140 and may include, for instance, an indoor positioning application and/or an indoor mapping application. Thus, the application executed by the at least one mobile device 140 may obtain real time information indicative of an individual's position in the building and transmit the real time information to the at least one receiver/transmitter 116 of the monitoring apparatus 110, and then the at least one processor 112 for further processing.

Additionally or alternatively, the predictive information may, for example, be obtained and/or transmitted by the at least one mobile device 140, such as by the same application as described above, or a different application as the real time information, or by another computing device, such as personal computer, computer workstation or other fixed computing device. As used herein, the at least one mobile device and the other computing device may be associated with an individual and, as a result, may be referenced as a user device. For instance, the at least one processor 112 may access predictive information provided by a calendar or scheduling application executed by the at least one user device in order to predict the location of the individual at a certain time, such as a certain time in the future. For example, the calendar application may identify a particular location, such as a conference room, that an individual is scheduled to visit during a particular time period. In an instance in which the user device is a mobile device and based on the current location of the mobile device, the at least one processor may also define a route that the individual is likely to take to reach the particular location, thereby providing a predicted location for the individual in advance of the particular time period.

Additionally, or alternatively, the predictive information may be obtained and/or transmitted by the at least one user device and may indicate a historical route an individual may take at a certain time. In this regard, the at least one user device may be configured to store and/or provide information indicative of an individual's location over the course of time, and the at least one user device and/or the at least one processor 112 may be configured to determine a pattern that the individual follows at a certain day and/or time. The pattern may indicate a historical route an individual may take at a certain day and/or time. For example, an individual may go to lunch along the same or similar path at a certain time most days or every day, or an individual (such as, for example, a mail delivery person) may travel the same route to deliver mail to rooms at a certain time. This information may be used as predictive information to determine the predicted location of the individual at a certain time.

As shown in FIG. 1, the system may also or alternatively include at least one sensor 160, such as at least one building sensor, configured to detect the presence of an individual within the building or within a particular space within the building and to provide real time information to the at least one processor 112 regarding the location of an individual within the building. For example, the at least one sensor may include any one of or combination of sensors capable of detecting an individual's position (such as, for example, cameras, infrared sensors, radio frequency identification (RFID) tag readers, Bluetooth tag-device, motion sensors, radar, heat sensors, etc.) In an example embodiment, the at least one building sensor may be one or more occupancy sensors, such as utilized by a smart building, to detect the presence of one or more individuals within the building or within a particular space within the building.

The real time information detected by the at least one sensor 160 may be information indicative of the presence of an individual. For example, in an instance in which the at least one sensor 160 is a motion sensor, if the sensor detects movement, then the sensor may determine this information to be indicative of an individual being located in the area defined by the field of view of the at least one sensor 160. Based on the real time information provided by the sensor of this example, the at least one processor 112 may be configured to determine that the location of an individual is near the sensor, such as within the field of view of the sensor. In an instance in which a sensor of the at least one sensor 160 is an RFID tag reader or a Bluetooth tag-device and a tag associated with an individual is detected, the at least one processor 112 may be configured to determine that the location of the individual is at or near the location of the RFID tag reader or Bluetooth tag-device based upon the real information provided by the sensor.

The database 130 may store a portion or all of the information obtained by the at least one user device and/or at least one sensor 160. Although the at least one processor 112 may obtain the information directly from the at least one sensor 160 in some embodiments, the at least one processor 112 of another example embodiment may access the information stored in the database 130 to determine predictive information indicative of a historical route that at least one individual may take at certain times and/or to a certain space within the building. This predictive information indicating a historical route may indicate a pattern in an individual's behavior, in terms of the routes the individual may take and the times the individual may take the routes. For example, an individual may go to lunch along the same or similar path at virtually the same time most days or every day, or an individual (such as, a mail delivery person) may travel the same route to deliver mail to rooms at a certain time. This information may be used as predictive information to determine the predicted location of the at least one individual at a certain time.

Although the at least one processor 112 may utilize real time information in some embodiments and predictive information in other embodiments to determine the presence and location of an individual, the at least one processor 112 of still further embodiments may use both real time information and predictive information in order to determine a space toward which an individual is headed. For example, the real time information may indicate the current location of an individual, such as via indoor positioning or tracking provided by at least one mobile device 140, or via the at least one sensor 160. In an instance in which the user device has access to the calendar of the individuals, the at least one processor may be configured to determine the location to which the individual is heading (e.g. with reference to FIG. 5, an individual 530-1 is currently walking in a direction 550 (according to real time information), and has a meeting in a room 516 in five minutes (according to predictive information) such that it is likely that the person is heading to the room 516).

Additionally, as illustrated in block 220 of FIG. 2, the monitoring apparatus includes means, such as the at least one processor 112, configured to control the one or more drones in the building according to the real time and/or predictive information in order for the drones to avoid the at least one individual while the drone is performing a task.

The at least one processor 112 of an example embodiment is configured to control the one or more drones in various manners, such as by (i) maintaining at least a predetermined distance away from the location of the at least one individual in the building according to the real time and/or predictive information; (ii) controlling the speed of the one or more drones according to the real time and/or predictive information; (iii) landing the drone according to the real time and/or predictive information; (iv) causing the one or more drones to fly to a landing and/or charging station of one or more such stations in the building, according to the real time and/or predictive information; or (v) causing the one or more drones to transmit a warning sound, according to the real time and/or predictive information.

For example, the at least one processor 112 may be configured to maintain at least a predetermined distance away from the location of at least one individual by maintaining, for example, a spacing of at least five feet from the location of an individual. However, it is to be understood that any distance may be used as the predetermined distance. Meanwhile, controlling the speed of the drone may include increasing or decreasing the speed of the drone, such as by decreasing the speed of the drone to less than 5 miles per hour, in an instance in which the information indicates that an individual is present within the building or within the same space within the building as the at least one drone.

In an instance in which the information indicates that an individual is in the same building or same space within the building as the at least one drone, the at least one processor 112 may be configured to land the drone, such as by landing the drone either permanently or temporarily. Once the drone has been landed, the at least one processor may continue to monitor the location of the individual with reference to the real time information and/or the predictive information and may permit the at least one drone to resume flight once the information indicates that the individual is no longer located within the building or, if in the building, is no longer within the same space as the at least one drone. By landing the at least one drone in an instance in which the individual is within the building or within the same space as the at least one drone, the drone is safely out of the way of individuals, and individuals are allowed to pass by the drone without coming in contact with the drone.

In another example embodiment, the at least one processor 112 is configured to cause the one or more drones to fly to a landing and/or charging station in the building in an instance in which the information indicates that the individual is within the building or, if within the building, is within the same space as the at least one drone. By diverting to a landing and/or charging station, the one or more drones may permanently or temporarily abort the task being performed by the one or more drones.

In an example embodiment, a plurality of landing and/or charging stations may be located throughout the building. Alternatively, there may only be one landing and/or charging station located in the building. These landing and/or charging stations may allow for the one or more drones to land and/or be recharged. In the instance in which there are multiple landing and/or charging stations, there may be at least one landing and/or charging station in each room, each hallway, some of the rooms, or some of the hallways within the building.

The at least one processor 112 of an example embodiment is configured to cause the one or more drones to transmit a warning sound, according to real time information and/or the predictive information, such as by causing a warning sound to be transmitted in an instance in which the location of the individual is near the at least one drone. In this regard, the at least one processor 112 is configured to command the one or more drones to transmit a sound that may indicate to at least one individual, such as a nearby individual, that a drone is near the location of the at least one individual, a drone is approaching at least one individual's position, and/or a drone is in a room that the at least one individual has entered.

Examples of the manner in which the one or more drones may be controlled according to the real time information and/or the predictive information will now be described with reference to FIGS. 3-6. It should be understood that any real time information, predictive information, or any combination thereof may cause the at least one processor 112 to control the one or more drones in any manner. These examples discussed below should not be interpreted to be limiting, but instead by way of example. Additionally, the use of one drone and one or two individuals in the examples of FIGS. 3-6 should not be interpreted as limiting, as any number of drones may be used and the location of any number of individuals may be monitored.

Figure 3:
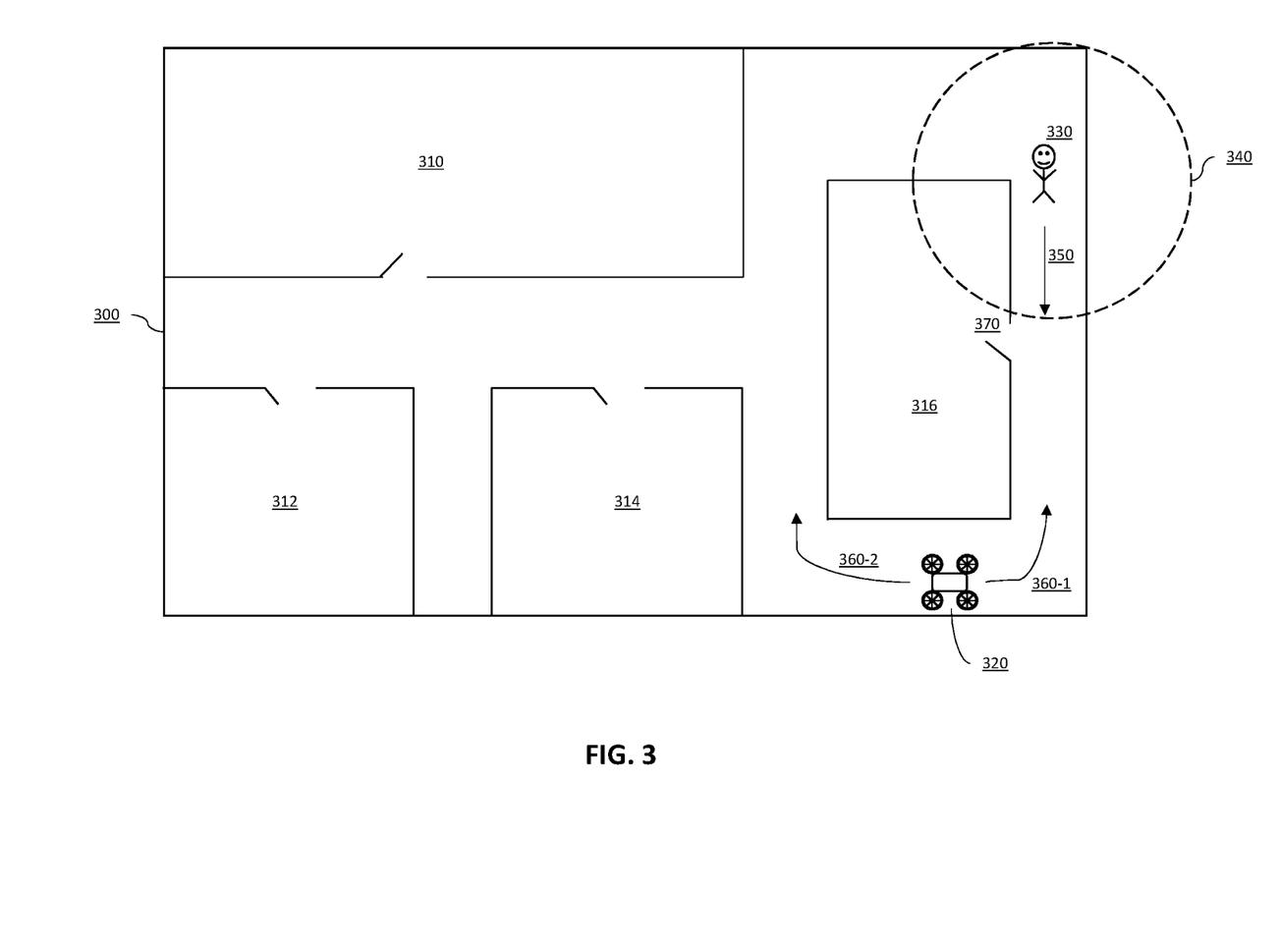
FIG. 3 depicts an example scenario and illustrates controlling of one or more drones according to information regarding the position of at least one individual in accordance with an example embodiment.

FIG. 3 illustrates a map of a floor 300 of a building with rooms 310, 312, 314, and 316. In this example, a drone 320 is performing a task, and in order to perform the task the drone is traveling in a direction 360-1 to enter into room 316 through the doorway 370. However, information indicative of the individual's position 330 indicates that the individual is traveling in a direction 350 toward the current location of the drone.

In this example, the at least one processor 112 is configured to maintain the drone 320 at least a predetermined distance 340 away from the individual's position 330. As the drone travels in the direction 360-1 towards the doorway 370, the predetermined distance 340 around the location of the individual 330 may encompass doorway 370. Thus, the at least one processor prevents the drone from entering the doorway 370 so as to maintain a separation of at least the predetermined distance from the individual, thus not allowing the drone 320 to continue on its route while the individual remains in its current location. In this example, the drone may be controlled to change direction to direction 360-2 in order to maintain the predetermined distance 340 away from the individual's position 330 by going around the room 316 to doorway 370 in order to perform the directed task. The drone 320 may enter the doorway 370 if the individual continues to travel in the direction 350, and the predetermined distance 340 from the individual does not encompass the doorway 370 once the individual has moved in direction 350.

Additionally, or alternatively, the at least one processor 112 may be configured to control the drone 320 by reducing the speed of the drone 320 as the drone 320 travels in the direction 360-1 once it is determined from the real time information and/or predictive information indicates that the routes of the individual and the drone will cause the individual and the drone to intersect or at least pass within a predetermined distance of one another. In this example embodiment, the drone 320 may then be directed to change direction to direction 360-2 and increase speed, at least temporarily, in order to maintain at least the predetermined distance 340 from the individual's position 330.

Additionally, or alternatively, as the drone 320 travelled in the direction 360-1, the at least one processor 112 may have determined that the drone 320 and individual were approaching each other and, as a result, the at least one processor may have caused the drone 320 to transmit a warning sound to indicate to the individual that a drone is approaching or is nearby.

Figure 4:
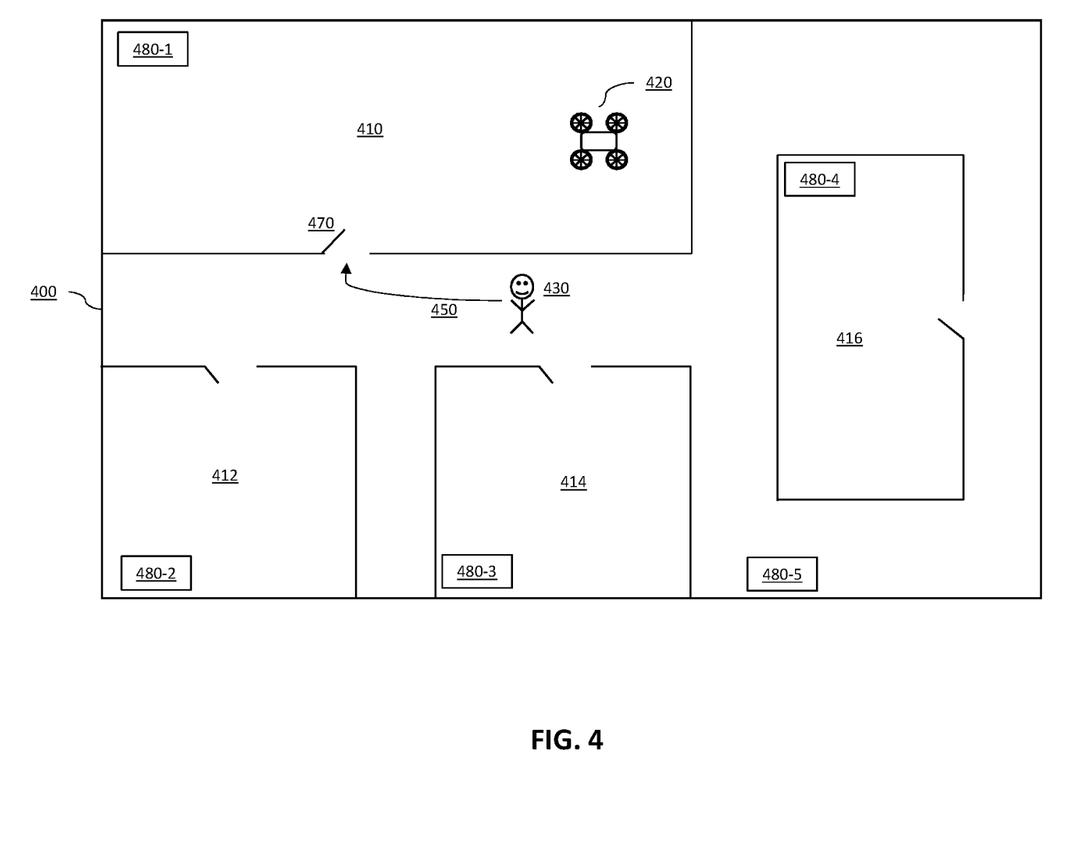
FIG. 4 depicts another example scenario and illustrates controlling of one or more drones according to information regarding the position of at least one individual in accordance with an example embodiment.

FIG. 4 illustrates a floor 400 of a building with rooms 410, 412, 414, and 416. In this example, a drone 420 is performing a task in a space (room 410). An individual's position 430 may be detected by the at least one processor 112 to be traveling in a direction 450 towards the room 410. If the at least one processor determines that the individual's position has entered the doorway 470 and into the space (room 410), then the at least one processor may control the drone 420 so as to land in the location at which it is currently located until the individual's position 430 is determined to be outside of the space (room 410).

Alternatively, as the individual's position is determined by the at least one processor 112 to enter the doorway 470, into the space (room 410), the at least one processor may be configured to control the drone 420 so as to fly to the landing and/or charging station 480-1 of the one or more landing/charging stations 480-1, 480-2, 480-3, 480-4, and 480-5. The at least one processor 112 may be configured to direct the drone 420 to fly to a particular landing and/or charging station 480-1, for any number of reasons, for example, because the landing and/or charging station 480-1 is within the same room 410 as the drone 420 or because the landing and/or charging station 480-1 is the closest landing and/or charging station from among the one or more landing and/or charging stations.

Additionally, in the instance in which the drone is directed to fly to the landing and/or charging station 480-1, as the individual's position is determined by the at least one processor 112 to enter the doorway 470 and into the space (room 410), the at least one processor 112 may be configured to cause the drone 420 to change speed, such as by slowing the speed of flight, in order to controllably fly to the landing and/or charging station 480-1. In this regard, the speed may be decreased in order to allow the individual to enter the room 410 and become aware of the drone's location. Alternatively, the speed of the drone may be increased in order for the drone to reach the landing and/or charging station before the location of the individual would interfere with the route of the drone as the drone flies to the landing and/or charging station 480-1.

By way of a continuation of the example of FIG. 4, as the individual's position is determined by the at least one processor 112 to enter the doorway 470 and into the space (room 410), the at least one processor 112 may also cause the drone 420 to transmit a warning sound. This warning sound may indicate to the individual that there is a drone 420 located in the room 410 that the individual has just entered.

Figure 5:
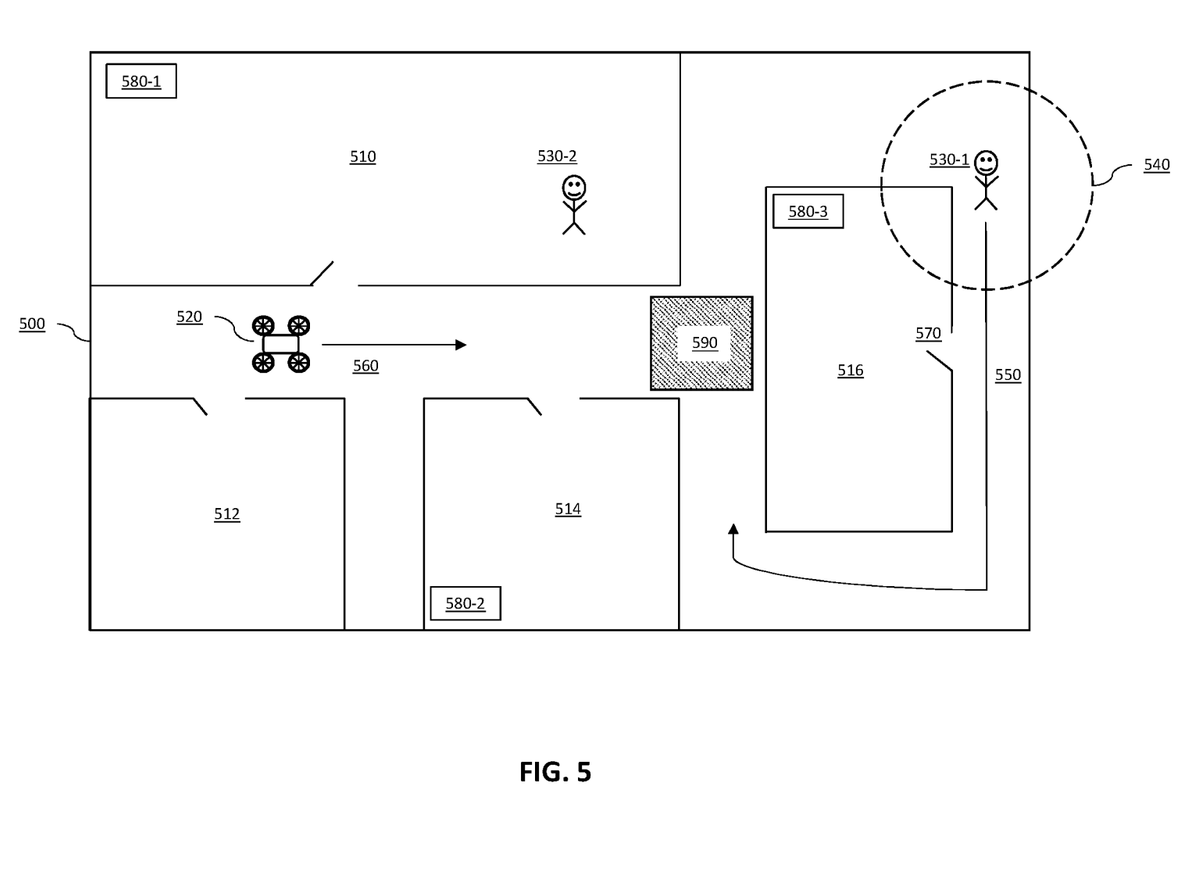
FIG. 5 depicts a further example scenario and illustrates controlling of one or more drones according to information regarding the position of at least one individual in accordance with an example embodiment.

FIG. 5 illustrates another floor 500 within a building with rooms 510, 512 and 514, and room 516 having doorway 570. In this example, an individual's position 530-1 is determined by the at least one processor 112 to be traveling in a direction 550 that is towards area 590. The individual's position 530-1 may be provided by real time information, such as provided by a building presence sensor, indicating an individual's current position and/or by predictive information from which the individual's position 530-1 and direction 550 of travel may be predicted, such as by predicting an individual's route along which the individual may be traveling to room 510.

In the instance in which the individual's positon 530-1 and direction 550 may be provided, at least partially, by predictive information, the predictive information may have been determined from a historical route the individual has taken at a certain time each day (as defined by information stored by the database 130 regarding the location of a user device of the individual in the past), or may have been determined from a calendar application executed by the user device of the individual that may have indicated that the individual has a meeting that begins at a certain time in the room 510.

As the location 530-1 of the individual indicates that the individual is traveling towards (or is predicted to be traveling towards) the area 590, the drone 520 of this example is also traveling in the direction 560 towards the area 590. The drone 520 may be controlled by the at least one processor 112 to speed up in order to reach the area 590 before the individual also reaches (or is predicted to reach) the area 590. Alternatively, the drone 520 may be controlled by the at least one processor 112 to land where it currently is located, if the information determined indicates that drone and location 530-1 of the individual will or is predicted to intersect.

As yet another alternative option, the drone 520 may be controlled by the at least one processor 112 to fly to one of the landing and/or charging stations, such as the closest one of the landing and/or charging stations 580-1, 580-2, and 580-3. In this example, the location 530-2 of another individual may be determined by real time information indicating the current location of the other individual and/or by predicted information indicating that a meeting is to be conducted in room 510 that the other individual will attend. Either way, the drone 520 may be controlled by the at least one processor 112 to fly to the landing and/or charging station 580-2, in order to avoid both the individual as the individual travels in direction 550 to the room 510 and in order to avoid entering the room 510 where the other individual is located.

Figure 6:
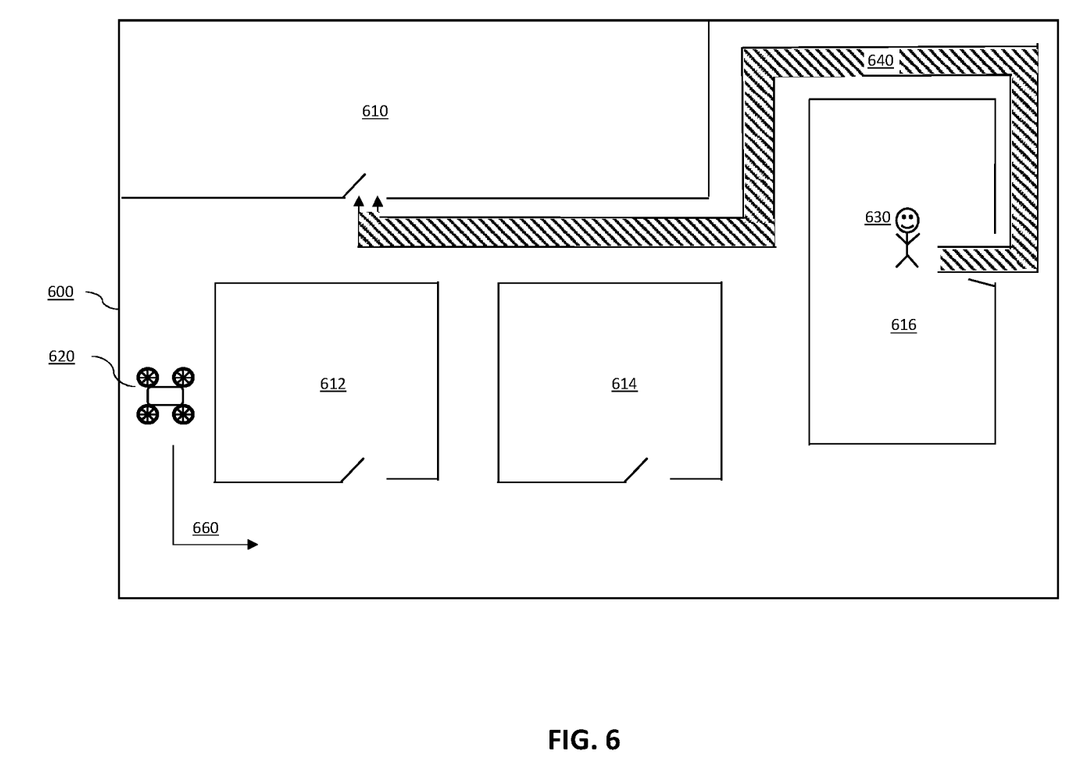
FIG. 6 depicts yet another example scenario and illustrates controlling of one or more drones according to information regarding the position of at least one individual in accordance with an example embodiment.

As another example, FIG. 6 illustrates a floor 600 of a building with rooms 610, 612, 614, and 616. In this example, predictive information indicative of a historical route that an individual is expected to take at a certain time (such as based on historical information stored by the database 130 indicative of the location of the individual in the past and/or patterns of past behavior) and/or predictive information from at least one calendar application executed by at least one user device may indicate that an individual 630 may travel along a path 640. In an instance in which the path 640 is defined by historical information stored by the database 130, this path may be, for example, a route taken by a mail delivery individual as the individual delivers mail to room 610. In an instance when the path 640 is indicative of information determined from at least one calendar application, this path may be, for example, defined based on information indicative of an individual having a meeting at a certain time in room 610. In either instance, the drone 620 may be controlled by the at least one processor 112 to travel in the direction 660 in order to maintain a predetermined distance away or in a non-intersecting direction away from the path 640 that the individual 630 may take on the way to room 610.

Accordingly, a method, apparatus, and system are provided for operating one or more drones within a building which also houses one or more people. The method, apparatus and system of an example embodiment are configured to safely operate the drone within the building. Additionally, the method, apparatus and system of an example embodiment are configured to operate the drone within the building even in an instance in which one or more people are also within the building, thereby increasing the utilization of the drone.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible.

Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for operating one or more drones in a building comprising:
    determining information comprising predictive information, wherein the predictive information is indicative of a predicted location of at least one individual in the building at a certain time in the future, and wherein the predictive information comprises at least one of: (i) information from at least one calendar or scheduling application indicative of the predicted location of the at least one individual, or (ii) information that defines a pattern established by the at least one individual that is indicative of a historical route taken by the at least one individual in the past on a particular day and/or at a particular time; and
    controlling the one or more drones in the building according to the predictive information to avoid the at least one individual while the drone is performing a task, wherein controlling the one or more drones comprises controlling a speed of the one or more drones according to the predictive information by limiting the speed of the one or more drones to a predetermined maximum speed in an instance in which the one or more drones are within a space where at least one individual is predicted to be present.

2. The method according to claim 1, wherein determining the information further comprises determining real time information comprising information from an application executed by at least one mobile device of the at least one individual, and wherein controlling the one or more drones comprises controlling the one or more drones in the building according to the predictive information and the real time information.

3. The method according to claim 1, wherein controlling the one or more drones comprises controlling the one or more drones to maintain the drone at least a predetermined distance away from the at least one individual in the building according to the predictive information.

4. The method according to claim 1, wherein controlling the one or more drones comprises landing the one or more drones according to the predictive information.

5. The method according to claim 1, wherein controlling the one or more drones comprises causing the one or more drones to fly to at least one of a landing or charging station in the building, according to the predictive information.

6. The method according to claim 1, wherein controlling the one or more drones comprises causing the one or more drones to transmit a warning sound, according to the predictive information.

7. The method according to claim 1, wherein determining the information further comprises determining real time information comprising information from at least one sensor in the building capable of detecting a position of the at least one individual, and wherein controlling the one or more drones comprises controlling the one or more drones in the building according to the predictive information and the real time information.

8. The method of claim 1, wherein the predictive information comprises information that defines a pattern established by the at least one individual that is indicative of a historical route taken by the at least one individual in the past on a particular day and/or at a particular time.

9. An apparatus for operating one or more drones in a building, the apparatus comprising at least one processor and at least one memory including computer program code, the at least one memory and the computer program code configured to, with the at least one processor, cause the apparatus at least to perform:
    determining information comprising predictive information, wherein the predictive information is indicative of a predicted location of at least one individual in the building at a certain time in the future, and wherein the predictive information comprises at least one of: (i) information from at least one calendar or scheduling application indicative of the predicted location of the at least one individual, or (ii) information that defines a pattern established by the at least one individual that is indicative of a historical route taken by the at least one individual in the past on a particular day and/or at a particular time; and
    controlling the one or more drones in the building according to the predictive information to avoid the at least one individual while the drone is performing a task, wherein controlling the one or more drones comprises controlling a speed of the one or more drones according to the predictive information by limiting the speed of the one or more drones to a predetermined maximum speed in an instance in which the one or more drones are within a space where at least one individual is predicted to be present.

10. The apparatus according to claim 9, wherein the at least one memory and the computer program code are further configured to, with the at least one processor, cause the apparatus to determine the information by determining real time information comprising information from an application executed by at least one mobile device of the at least one individual, and wherein the at least one memory and the computer program code are further configured to, with the at least one processor, cause the apparatus to control the one or more drones by controlling the one or more drones in the building according to the predictive information and the real time information.

11. The apparatus according to claim 9, wherein the at least one memory and the computer program code are configured to, with the at least one processor, cause the apparatus to control the one or more drones by controlling the one or more drones to maintain the drone at least a predetermined distance away from the at least one individual in the building according to the predictive information.

12. The apparatus according to claim 9, wherein the at least one memory and the computer program code are configured to, with the at least one processor, cause the apparatus to control the one or more drones by landing the one or more drone according to the predictive information.

13. The apparatus according to claim 9, wherein the at least one memory and the computer program code are configured to, with the at least one processor, cause the apparatus to control the one or more drones by causing the one or more drones to fly to at least one of a landing or charging station in the building, according to the predictive information.

14. The apparatus according to claim 9, wherein the at least one memory and the computer program code are configured to, with the at least one processor, cause the apparatus to control the one or more drones by causing the one or more drones to transmit a warning sound, according to the predictive information.

15. The apparatus according to claim 9, wherein the at least one memory and the computer program code are further configured to, with the at least one processor, cause the apparatus to determine the information by determining real time information comprising information from at least one sensor in the building capable of detecting a position of the at least one individual, and wherein the at least one memory and the computer program code are further configured to, with the at least one processor, cause the apparatus to control the one or more drones by controlling the one or more drones in the building according to the predictive information and the real time information.

16. The apparatus according to claim 9, wherein the predictive information comprises information that defines a pattern established by the at least one individual that is indicative of a historical route taken by the at least one individual in the past on a particular day and/or at a particular time.

17. A system for operating one or more drones in a building, the system comprising:
a monitoring apparatus comprising at least one processor and at least one memory including computer program code, the at least one memory and the computer program code configured to, with the at least one processor, cause the monitoring apparatus to determine information comprising predictive information, wherein the predictive information is indicative of a predicted location of at least one individual in the building at a certain time in the future, and wherein the predictive information comprises at least one of: (i) information from at least one calendar or scheduling application indicative of the predicted location of the at least one individual, or (ii) information that defines a pattern established by the at least one individual that is indicative of a historical route taken by the at least one individual in the past on a particular day and/or at a particular time; and
one or more drones in the building, the one or more drones configured to operate under control of the monitoring apparatus and in accordance with the predictive information to avoid the at least one individual while the drone is performing a task, wherein the one or more drones are controlled by the monitoring apparatus in order to control a speed of the drone according to the predictive information by limiting the speed of the one or more drones to a predetermined maximum speed in an instance in which the one or more drones are within a space where at least one individual is predicted to be present.

18. The system according to claim 17, wherein the monitoring apparatus is caused to determine the information by determining real time information comprising information from an application executed by at least one mobile device of the at least one individual, and wherein the one or more drones are controlled by the monitoring apparatus according to both the predictive information and the real time information.

19. The system according to claim 17, further comprising at least one sensor in the building capable of detecting the position of the at least one individual, wherein the at least one sensor is in communication with the monitoring apparatus so as to provide real time information regarding the position of the at least one individual.

20. The system according to claim 17, wherein the predictive information comprises information that defines a pattern established by the at least one individual that is indicative of a historical route taken by the at least one individual in the past on a particular day and/or at a particular time.

* * * * *